W. L. MARTIN
March 12, 1929. DRIER Re. 17,237
Original Filed Nov. 18, 1924
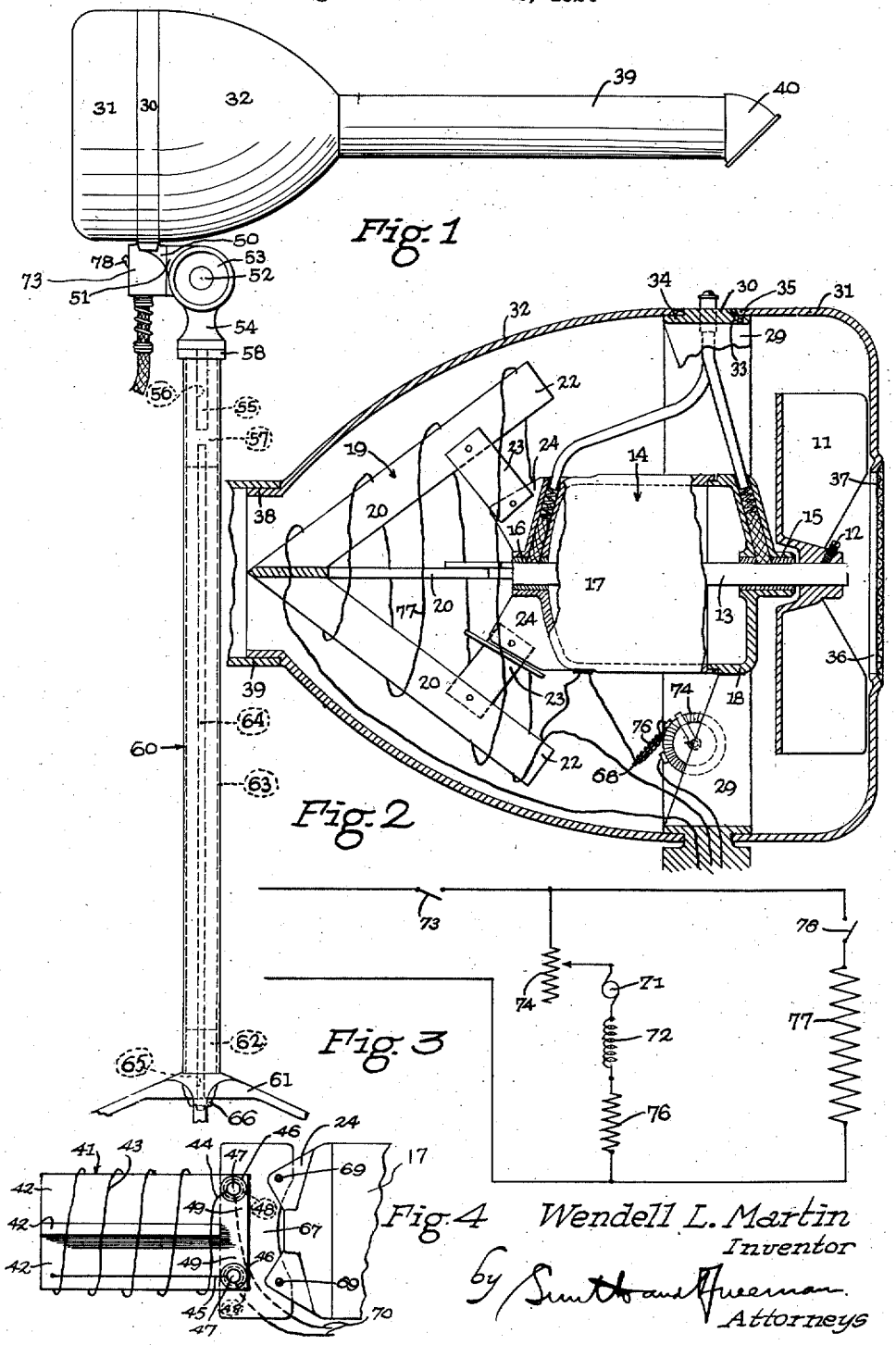
Wendell L. Martin
Inventor
by Smith and Freeman
Attorneys Reissued Mar. 12, 1929.

Re. 17,237

UNITED STATES PATENT OFFICE.

WENDELL L. MARTIN, OF CLEVELAND, OHIO, ASSIGNOR TO THE MARTIN BROTHERS ELECTRIC COMPANY, OF CLEVELAND, OHIO, A CORPORATION OF OHIO.

DRIER.

Original No. 1,660,801, dated February 28, 1928, Serial No. 750,584, filed November 18, 1924. Application for reissue filed December 6, 1928. Serial No. 324,261.

My invention relates to driers and the principal object of my invention is to provide a new and improved device of this type. In the drawings accompanying this specification and forming a part thereof I have shown, for purposes of illustration, certain forms which my invention may assume. In these drawings:

Figure 1 is a general view of this illustrative embodiment of my invention,

Figure 2 is a section through the operating parts of the device taken on a plane parallel to Figure 1, Figure 3 is a diagrammatic representation of the electrical system, while Figure 4 is a fragmentary view illustrating a modified form of heating unit.

The device shown in Figures 1 through 3 comprises a fan 11 secured by means of a set screw 12 to one end of a shaft 13 forming the armature shaft of a motor 14 and supported in bearings 15 and 16 carried respectively by two shell sections 17 and 18 which together form a shell completely enclosing the motor 14. In addition, the shell section 17 also carries on its forward end a heating unit 19 comprising a plurality of converging bars 20 having their converging ends 21 secured together in any suitable manner as by bolting and having their diverging ends 22 connected by means of struts 23 to fins 24 integral with and extending from the forward end of the shell section 17.

This entire unit is secured to a supporting ring 30 by means of radially extending ribs 29 integral with both the shell section 17 and the ring 30 while the entire unit is enclosed by a pair of casing sections 31 and 32 overlying respectively the rear and forward sides of the ring 30, embracing reduced shoulders 33 and 34 upon the ring 30, and secured to the ring 30 in any suitable manner, as by set screws 35 extending through the casing sections 31 and 32 into the reduced portions 33 and 34 respectively. The rear casing section 31 is provided at its central portion with an aperture 36 arranged to permit the entrance of air into the casing and provided with a suitable screen 37 to prevent the entrance of dirt or other foreign matter, while the forward casing section 32 is provided at its central part with an extension 38 embraced by and supporting a tube 39 provided at its free end with a swiveled nozzle arranged to direct the air in any desired direction.

The ring 30, and the entire unit carried thereby, are supported by means of a bracket 50 integral with the ring 30 and itself provided with a circular projection 51 adapted to be held by means of a bolt 52 in cooperating pivotal relation with a similar circular projection 53 carried by a stud 54 provided also with a pin 55 arranged to be rotatably received by any suitable socket such as the recess 56 extending downwardly into the plug portion 57 of a cap 58 forming part of a stand 60 which also comprises a base 61 provided with an upwardly extending plug 62 surrounded by a shell 63 extending from the base 61 to the cap 58 and surrounding at its other end the plug 57 of the cap 58. The cap 58, shell 63, and base 61 are held in assembled relation by means of a rod 64 screw-threadedly engaging the plug 57, extending from the cap 58 through the shell 60 and an aperture 65 in the base 61, and engaged below the base 61 by a nut 66.

The motor 14 is preferably of the series alternating current type and has its armature 71 and field 72 connected in series across the line through a control switch 73 carried by the bracket 50, through a speed controlling rheostat 74 carried by the ring 30 and provided with a shaft 75 extending through the ring 30 and surmounted by an accessible operating handle (not shown), and through a compensating resistance 75 formed about a bar 68 carried by the rheostat 74 and used, when the motor is operating on direct current, to compensate for the decrease in impedance. The heating element 77 is connected directly across the line through the motor control switch 73 and a heater control switch 78 also carried by the bracket 50.

The alternative heating unit disclosed in Figure 4 comprises a heating unit frame 41 in the form of an elongated cross provided with four arms 42 meeting at a common junction line and arranged to support the heating coil 43 with the ends 44 and 45 thereof connected under nuts 46 carried by a pair of bolts 47 which are in turn provided with heads 48 overlying and clamping the ends of the circuit wires 70 and are also effective to secure the frame 41 in position on the motor shell section 17 by bolting the projecting ends 49 of two opposite arms 42 of the frame 41 to a plate 67 secured to the lugs 24 by means of suitable bolts 69.

It will be obvious from the above description that the entire unit herein shown may be readily removed from the supporting stand without in any way disassembling the stand and may thereafter be supported from any other suitable stand or bracket, that by means of the pivotal connection of the stud 54 to the cap 58 and the pivotal connection between the bracket 50 and the stud 54 the unit may be swung into any desired position, that the construction herein shown makes an extremely light casing while still affording ample support to the operating and heating mechanism within the casing, that the motor shell formation herein shown prevents the air current traversing the interior of the motor and therefore minimizes the likelihood of the air current picking up oil or offensive odors occurring in the motor while at the same time permitting the air current to pass over and cool the motor, that each formation of heater frame herein shown provides a thoroughly rigid yet economical support for the heating element and at the same time serves to prevent and destroy circulatory eddies in the air current, that the rheostat control of the motor permits full control of the volume of air being delivered, either with the heating element on or without the heating element, to thus fully control the volume of the air current under all conditions and also control the temperature of the air when the heater is in operation, and that the construction shown in Figure 4 provides a readily removable heating unit. Those skilled in the art will find additional advantages in the particular embodiments of my invention herein disclosed and will also readily realize that these particular embodiments may be variously changed and modified without departing from the spirit of my invention or sacrificing the advantages thereof. It will therefore be understood that this disclosure is illustrative only and that my invention is not limited thereto.

I claim:

1. In combination, a support, a relatively heavy supporting ring carried by said support, a blower carried by said ring internally thereof, a heating unit carried by said blower, a relatively light first casing member supported by said ring and enclosing said blower and heating unit on one side of said ring, and a relatively light second casing member also supported by said ring and enclosing said blower and heating unit on the other side of said ring.

2. In combination, a support, a relatively heavy supporting ring carried by said support, a blower and a heating unit supported by said ring internally thereof, a relatively light first casing member supported by said ring and enclosing said blower and heating unit on one side of said ring, and a relatively light casing member also supported by said ring and enclosing said blower and heating unit on the other side of said ring.

3. In combination, a support, a relatively heavy supporting ring carried by said support, a blower carried by said ring internally thereof, a relatively light first casing member supported by said ring and enclosing said blower on one side of said ring, and a relatively light second casing member also supported by said ring and enclosing said blower on the other side of said ring.

4. A drier comprising a motor, a fan operated thereby, a heating unit in the path of the air current set up by said fan and effective to warm the air in said current, and a resistance arranged in the circuit of said motor and also positioned in the path of said current but ahead of said heating unit.

5. A drier, comprising; a support; a relatively heavy supporting ring carried by said support; a blower carried by said ring internally thereof and including an electric motor and a fan on the shaft of said motor; a relatively light first casing member supported by said ring and enclosing said blower on one side of said ring; and a relatively light second casing member also supported by said ring and enclosing said blower on the other side of the ring.

6. A drier, comprising: a support; a relatively heavy ring carried by said support; a blower carried by said ring internally thereof and including an electric motor and a fan on the shaft of said motor; a relatively light first casing member supported by said ring and enclosing said blower on one side of said ring; a relatively light second casing member also supported by said ring and enclosing said blower on the other side of the ring; and a heater, for heating the air current set up by said blower, mounted within said casing members supported by said motor.

7. A drier, comprising: a support; a relatively heavy supporting ring carried by said support; a blower carried by said ring internally thereof; a relatively light and short inlet casing member supported by said ring, provided with inlet aperturing, and enclosing said blower on one side of said ring; and a relatively light outlet casing member also supported by said ring and enclosing said blower on the other side of said ring; said blower comprising a fan disposed within said inlet member adjacent said inlet aperturing.

8. A drier, comprising: a support; a relatively heavy supporting ring carried by said support; a blower carried by said ring internally thereof; a relatively light inlet casing member supported by said ring and enclosing said blower on one side of said ring;

a relatively light elongated outlet casing member also supported by said ring and enclosing said blower on the other side of said ring; and a heater within said outlet member for heating the air current set up by said blower.

9. A drier, comprising: a support; a relatively heavy supporting ring carried by said support; a blower carried by said ring internally thereof; a relatively light and short inlet casing member supported by said ring, provided with inlet aperturing, and enclosing said blower on one side of said ring; a relatively light elongated outlet casing member also supported by said ring and enclosing said blower on the other side of said ring; and a heater within said outlet member for heating the air current set up by said blower; said blower comprising a fan disposed in said inlet member adjacent said aperturing.

10. A drier, comprising: a support; a relatively heavy supporting ring carried by said support; a blower carried by said ring internally thereof and including an electric motor and a fan on the shaft of said motor; a relatively light and short inlet casing member supported by said ring, provided with inlet aperturing, and enclosing said blower on one side of said ring; and a relatively light outlet casing member also supported by said ring and enclosing said blower on the other side of said ring; the fan of said blower being disposed within said inlet member adjacent said inlet aperturing.

11. A drier, comprising: a support; a relatively heavy supporting ring carried by said support; a blower carried by said ring internally thereof; a relatively light inlet casing member supported by said ring and enclosing said blower on one side of said ring; a relatively light elongated outlet casing member also supported by said ring and enclosing said blower on the other side of said ring; and a heater, for heating the air current set up by said blower, mounted within said outlet member supported by said ring.

12. A drier, comprising: a support; a relatively heavy supporting ring carried by said support; a blower carried by said ring internally thereof; a relatively light inlet casing member supported by said ring and enclosing said blower on one side of said ring; a relatively light elongated outlet casing member also supported by said ring and enclosing said blower on the other side of said ring; and a heater, for heating the air current set up by said blower, mounted within said outlet member supported by said blower.

13. A drier, comprising: a support; a relatively heavy supporting ring carried by said support; a blower carried by said ring internally thereof and including an electric motor and a fan on the shaft of said motor; a relatively light inlet casing member supported by said ring and enclosing said blower on one side of said ring; a relatively light elongated outlet casing member also supported by said ring and enclosing said blower on the other side of said ring; and a heater, for heating the air current set up by said blower, mounted within said outlet member supported by said motor.

14. A drier, comprising: a support; a relatively heavy supporting ring carried by said support; a blower carried by said ring internally thereof and including an electric motor and a fan on the shaft of said motor; a relatively light and short inlet casing member supported by said ring, provided with inlet aperturing, and enclosing said blower on one side of said ring; a relatively light elongated outlet casing member also supported by said ring and enclosing said blower on the other side of said ring; and a heater within said outlet member for heating the air current set up by said blower; said fan being disposed in said inlet member adjacent said aperturing.

15. A drier, comprising: a support; a relatively heavy supporting ring carried by said support; a blower carried by said ring internally thereof; a relatively light and short inlet casing member supported by said ring, provided with inlet aperturing, and enclosing said blower on one side of said ring; a relatively light elongated outlet casing member also supported by said ring and enclosing said blower on the other side of said ring; and a heater, for heating the air current set up by said blower, mounted within said outlet member supported by said ring; said blower comprising a fan disposed in said inlet member adjacent said aperturing.

16. A drier, comprising: a support; a relatively heavy supporting ring carried by said support; a blower carried by said ring internally thereof; a relatively light and short inlet casing member supported by said ring, provided with inlet aperturing, and enclosing said blower on one side of said ring; a relatively light elongated outlet casing member also supported by said ring and enclosing said blower on the other side of said ring; and a heater, for heating the air current set up by said blower, mounted within said outlet member supported by said blower; said blower comprising a fan disposed in said inlet member adjacent said aperturing.

17. A drier, comprising: a support; a relatively heavy supporting ring carried by said support; a blower carried by said ring internally thereof and including an electric motor and a fan on the shaft of said motor; a relatively light and short inlet casing member supported by said ring, provided with inlet aperturing, and enclosing said blower on one side of said ring; a relatively light elongated outlet casing member also supported by said ring and enclosing said blower on the other side of said ring; and a heater, for heating the air current set up by said blower, mounted within said outlet member supported by said motor; said blower comprising a fan disposed in said inlet member adjacent said aperturing.

18. A drier, comprising: a motor; a fan operated thereby; a heating unit in the path of the air current set up by said fan and effective to warm the air in said current; and a resistance arranged in the circuit of said motor and positioned to radiate heat to said air current ahead of said heating unit.

19. A drier, comprising: a motor; a fan operated thereby; a heating unit in the path of the air current set up by said fan and effective to warm the air in said current after such air leaves said fan; and a resistance arranged in the circuit of said motor and positioned to radiate heat to said air current ahead of said heating unit.

20. A drier, comprising: a motor; a fan operated thereby; a heating unit in the path of the air current set up by said fan and effective to warm the air in said current; and a resistance arranged in the circuit of said motor and positioned to radiate heat to said air current ahead of said heating unit but beyond said fan.

21. A drier, comprising: a motor; a fan operated thereby; a heating unit in the path of the air current set up by said fan and effective to warm the air in said current; and a resistance arranged in the circuit of said motor and positioned in such air current ahead of said heating unit but beyond said fan.

In testimony whereof I hereunto affix my signature.

WENDELL L. MARTIN.

DISCLAIMER

Re. 17,237.—*Wendell L. Martin*, Cleveland, Ohio. DRIER. Patent dated March 12, 1929. Disclaimer filed October 31, 1934, by the assignee, *The Martin Brothers Electric Company*.

Hereby disclaims claims 2, 3, 5, 8 and 11 which read as follows:

"2. In combination, a support, a relatively heavy supporting ring carried by said support, a blower and a heating unit supported by said ring internally thereof, a relatively light first casing member supported by said ring and enclosing said blower and heating unit on one side of said ring, and a relatively light casing member also supported by said ring and enclosing said blower and heating unit on the other side of said ring.

"3. In combination, a support, a relatively heavy supporting ring carried by said support, a blower carried by said ring internally thereof, a relatively light first casing member supported by said ring and enclosing said blower on one side of said ring, and a relatively light second casing member also supported by said ring and enclosing said blower on the other side of said ring."

"5. A drier, comprising: a support; a relatively heavy supporting ring carried by said support; a blower carried by said ring internally thereof and including an electric motor and a fan on the shaft of said motor; a relatively light first casing member supported by said ring and enclosing said blower on one side of said ring; and a relatively light second casing member also supported by said ring and enclosing said blower on the other side of the ring."

"8. A drier, comprising: a support; a relatively heavy supporting ring carried by said support; a blower carried by said ring internally thereof; a relatively light inlet casing member supported by said ring and enclosing said blower on one side of said ring; a relatively light elongated outlet casing member also supported by said ring and enclosing said blower on the other side of said ring; and a heater within said outlet member for heating the air current set up by said blower."

"11. A drier, comprising: a support; a relatively heavy supporting ring carried by said support; a blower carried by said ring internally thereof; a relatively light inlet casing member supported by said ring and enclosing said blower on one side of said ring; a relatively light elongated outlet casing member also supported by said ring and enclosing said blower on the other side of said ring; and a heater, for heating the air current set up by said blower, mounted within said outlet member supported by said ring."

[*Official Gazette January 22, 1935.*]

ported by said ring and enclosing said blower on the other side of said ring; and a heater, for heating the air current set up by said blower, mounted within said outlet member supported by said motor; said blower comprising a fan disposed in said inlet member adjacent said aperturing.

18. A drier, comprising: a motor; a fan operated thereby; a heating unit in the path of the air current set up by said fan and effective to warm the air in said current; and a resistance arranged in the circuit of said motor and positioned to radiate heat to said air current ahead of said heating unit.

19. A drier, comprising: a motor; a fan operated thereby; a heating unit in the path of the air current set up by said fan and effective to warm the air in said current after such air leaves said fan; and a resistance arranged in the circuit of said motor and positioned to radiate heat to said air current ahead of said heating unit.

20. A drier, comprising: a motor; a fan operated thereby; a heating unit in the path of the air current set up by said fan and effective to warm the air in said current; and a resistance arranged in the circuit of said motor and positioned to radiate heat to said air current ahead of said heating unit but beyond said fan.

21. A drier, comprising: a motor; a fan operated thereby; a heating unit in the path of the air current set up by said fan and effective to warm the air in said current; and a resistance arranged in the circuit of said motor and positioned in such air current ahead of said heating unit but beyond said fan.

In testimony whereof I hereunto affix my signature.

WENDELL L. MARTIN.

DISCLAIMER

Re. 17,237.—*Wendell L. Martin*, Cleveland, Ohio. DRIER. Patent dated March 12, 1929. Disclaimer filed October 31, 1934, by the assignee, *The Martin Brothers Electric Company*.

Hereby disclaims claims 2, 3, 5, 8 and 11 which read as follows:

"2. In combination, a support, a relatively heavy supporting ring carried by said support, a blower and a heating unit supported by said ring internally thereof, a relatively light first casing member supported by said ring and enclosing said blower and heating unit on one side of said ring, and a relatively light casing member also supported by said ring and enclosing said blower and heating unit on the other side of said ring.

"3. In combination, a support, a relatively heavy supporting ring carried by said support, a blower carried by said ring internally thereof, a relatively light first casing member supported by said ring and enclosing said blower on one side of said ring, and a relatively light second casing member also supported by said ring and enclosing said blower on the other side of said ring."

"5. A drier, comprising: a support; a relatively heavy supporting ring carried by said support; a blower carried by said ring internally thereof and including an electric motor and a fan on the shaft of said motor; a relatively light first casing member supported by said ring and enclosing said blower on one side of said ring; and a relatively light second casing member also supported by said ring and enclosing said blower on the other side of the ring."

"8. A drier, comprising: a support; a relatively heavy supporting ring carried by said support; a blower carried by said ring internally thereof; a relatively light inlet casing member supported by said ring and enclosing said blower on one side of said ring; a relatively light elongated outlet casing member also supported by said ring and enclosing said blower on the other side of said ring; and a heater within said outlet member for heating the air current set up by said blower."

"11. A drier, comprising: a support; a relatively heavy supporting ring carried by said support; a blower carried by said ring internally thereof; a relatively light inlet casing member supported by said ring and enclosing said blower on one side of said ring; a relatively light elongated outlet casing member also supported by said ring and enclosing said blower on the other side of said ring; and a heater, for heating the air current set up by said blower, mounted within said outlet member supported by said ring."

[*Official Gazette January 22, 1935.*]